(12) United States Patent
Jain

(10) Patent No.: US 9,966,728 B2
(45) Date of Patent: May 8, 2018

(54) RAMAN FIBER LASER

(71) Applicant: STC.UNM, Albuquerque, NM (US)

(72) Inventor: Ravinder K. Jain, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days. days.

(21) Appl. No.: 15/410,406

(22) Filed: Jan. 19, 2017

(65) Prior Publication Data
US 2017/0207599 A1 Jul. 20, 2017

Related U.S. Application Data

(60) Provisional application No. 62/280,389, filed on Jan. 19, 2016.

(51) Int. Cl.
| | |
|---|---|
| *H01S 3/30* | (2006.01) |
| *H01S 3/102* | (2006.01) |
| *H01S 3/105* | (2006.01) |
| *H01S 3/094* | (2006.01) |
| *G02B 6/02* | (2006.01) |
| *H01S 3/10* | (2006.01) |

(52) U.S. Cl.
CPC .......... *H01S 3/302* (2013.01); *G02B 6/02142* (2013.01); *H01S 3/094046* (2013.01); *H01S 3/1003* (2013.01); *H01S 3/1028* (2013.01); *H01S 3/1053* (2013.01)

(58) Field of Classification Search
CPC ...... H01S 3/302; H01S 3/1003; H01S 3/1053; H01S 3/1028; H01S 3/094046; G02B 6/02142
See application file for complete search history.

(56) References Cited

U.S. PATENT DOCUMENTS

| | | | |
|---|---|---|---|
| 6,510,276 B1 | 1/2003 | Jain et al. | |
| 6,534,248 B2 | 3/2003 | Jain et al. | |
| 6,570,893 B1 | 5/2003 | Libatique et al. | |
| 2003/0223688 A1* | 12/2003 | Zhao | G02B 6/02057 385/37 |
| 2004/0033018 A1* | 2/2004 | Durkin | G02B 6/02123 385/37 |
| 2009/0296743 A1* | 12/2009 | Islam | H01S 3/2316 372/3 |
| 2010/0154620 A1* | 6/2010 | Loock | G01H 9/004 84/724 |

(Continued)

OTHER PUBLICATIONS

Bernier et al., Mid-infrared chalcogenide glass Raman fiber laser, Optics Letters, Jan. 15, 2013.

(Continued)

*Primary Examiner* — Yuanda Zhang
(74) *Attorney, Agent, or Firm* — Nathaniel A. Gilder; Jensen & Puntigam, PS

(57) ABSTRACT

Improved Raman Fiber Laser (RFL) generators may include a mid-infrared fiber, e.g., a fiber comprising a tellurite glass, a chalcogenide glass, a fluoride glass, or similar material. A phase-shifted fiber Bragg grating may be inscribed in the fiber. A pump laser generator may be coupled with the fiber in order to supply a pump laser to the fiber. When stimulated by the pump laser, the RFL generator may emit an output laser having a mid-infrared wavelength. A tuner may be used to tune the output laser.

17 Claims, 10 Drawing Sheets

(56) References Cited

U.S. PATENT DOCUMENTS

| | | | | |
|---|---|---|---|---|
| 2012/0106893 A1* | 5/2012 | Kashyap | ............ | G02B 6/02147 385/37 |
| 2014/0112357 A1* | 4/2014 | Abedin | ................ | H01S 3/0675 372/3 |
| 2014/0204436 A1* | 7/2014 | Li | ...................... | G02B 6/02133 359/3 |

OTHER PUBLICATIONS

Deng et al., Demonstration of a cw room temperature mid-IR microlaser, Optics Letters, Aug. 1, 2014.

Jain et al., A high-efficiency tunable cw Raman oscillator, Applied Physics Letters, Feb. 1, 1977.

Jain et al., A tunable multiple Stokes cw fiber Raman oscillator, Applied Physics letters, Jul. 15, 1977.

Libatique et al., 'Field-usable' diode-pumped-120 nm wavelength-tunable CW mid-IR fibre laser, Electronics Letters, Apr. 27, 2000.

Ma et al., A narrow linewidth (< 1 GHz), > 35nm wavelength-tunable mid-IR fiber laser for spectroscopic sensing applications, Optical Society of America, 2002.

O'Donnell et al., Tellurite and Fluorotellurite Glasses for Fiberoptic Raman Amplifiers: Glass Characterization, Optical Properties, Raman Gain, Preliminary Fiberization, and Fiber Characterization, J. Am. Ceram. Soc., 2007.

Poppe et al., 980nm diode-pumped continuous wave mid-IR (2.7pm) fibre laser, Electronics Letters, Nov. 26, 1998.

Suo et al., Fiber Bragg gratings inscribed using 800nm femtosecond laser and a phase mask in single and multi-core mid-IR glass fibers, Optical Society of America, 2009.

Zhu et al., Watt-Level 100-nm Tunable 3-um Fiber Laser, IEEE Photonics Technology Letters, Jan. 15, 2008.

Zhu et al., 5 W Diode-Pumped Mid-Infrared Fiber Amplifier, Optical Society of America, 2006.

Zhu et al., Scaling up Laser Diode Pumped Mid-infrared Fiber Laser to 10-Watt-level, Optical Society of America, 2005.

Bernier et al., All-fiber DFB laser operating at 2.8 μm, Optics Letters, Jan. 1, 2015.

Azmi et al., Output power and threshold gain of apodized DFB fiber laser, Proc. of SPIE, 2009.

Fernandes, Transfer matrix modelling in DFB lasers, Microelectronic Engineering, 1998.

Kremp et al., Closed-Form Approximations to the Threshold Quantities of Distributed-Feedback Lasers With Varying Phase Shifts and Positions, IEEE Journal of Quantum Electronics, Mar. 2013.

Lauridsen et al., Design of DFB fibre lasers, Electronics Letters, Oct. 15, 1998.

Loveseth, Single and Multiple Wavelength DFB Fiber Lasers, Jun. 27, 2001.

Luo et al., Numerical Modeling and Optimization of Mid-Infrared Fluoride Glass Raman Fiber Lasers Pumped by Tm3 +-Doped Fiber Laser, IEEE Photonics Journal, Apr. 2013.

Makino, Threshold Condition of DFB Semiconductor Lasers by the Local-Normal-Mode Transfer-Matrix Method: Correspondence to the Coupled-Wave Method, Journal of Lightwave Technology, Dec. 1994.

Peng et al., Apodized distributed feedback fiber laser with asymmetrical outputs for multiplexed sensing applications, Optics Express, May 2013.

Radic et al., Theory of low-threshold optical switching in nonlinear phase-shifted periodic structures, J. Opt. Soc. Am. B, Apr. 1995.

Rønnekleiv et al., Characterization of fiber distributed-feedback lasers with an index-perturbation method, Applied Optics, Jul. 20, 1999.

Shi et al., Highly efficient Raman distributed feedback fibre lasers, Optics Express, Feb. 15, 2002.

Shi et al., Detailed study of four-wave mixing in Raman DFB fiber lasers, Optics Express, Sep. 12, 2014.

Shi et al., Raman DFB Fiber Laser with Truly Unidirectional Output, Optical Society of America, 2011.

Tremblay et al., Effects of the phase shift split on phase-shifted fiber Bragg gratings, J. Opt. Soc. Am. B, Aug. 2006.

Westbrook et al., Raman fiber distributed feedback lasers, Optics Letters, Aug. 1, 2011.

Zhu et al., Towards ten-watt-level 3-5 μm Raman lasers using tellurite fiber, Optics Express, Feb. 2, 2015.

* cited by examiner

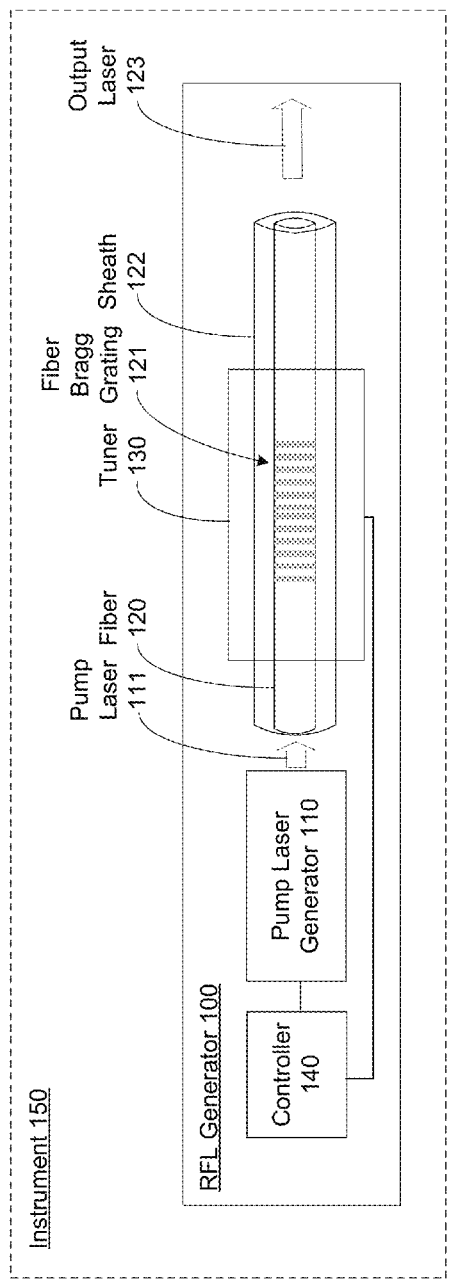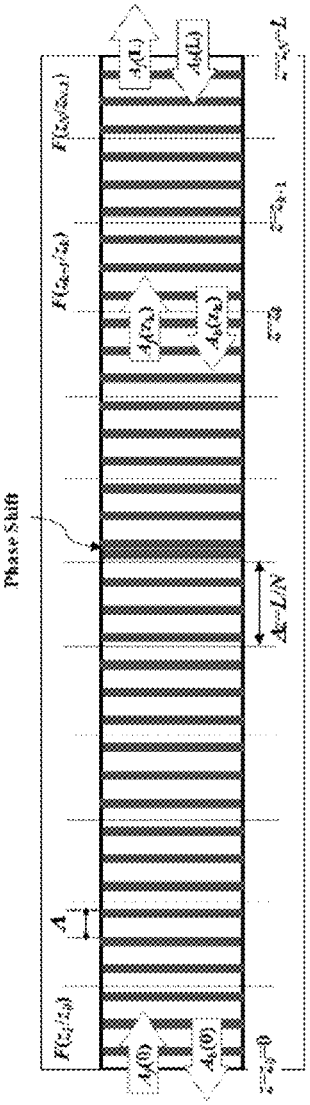
FIG. 1
FIG. 2

RAMAN FIBER LASER

CROSS REFERENCE TO RELATED APPLICATIONS

Priority is claimed to U.S. Provisional Application No. 62/280,389, filed on Jan. 19, 2016, entitled "A New Laser Platform Technology for Narrow-Linewidth Mid-Infrared Fiber Lasers," which is incorporated by reference in its entirety.

BACKGROUND

The term "laser" originated as an acronym for "light amplification by stimulated emission of radiation." Today, many different types of lasers have been developed, and lasers are usefully applied in a wide variety of scientific and commercial applications. However, lasers remain an area of active scientific research and development, and new types of lasers continue to emerge, finding many new and useful applications.

One type of laser, the "optical parametric oscillators" are generally cumbersome and expensive, and too large for applications that require relatively portable sources and field usability. Another type of laser, the "Semiconductor-based quantum cascade lasers (QCLs)" have exhibited significant improvements in the last decade, but narrow linewidth tunable QCLs are based on external cavity configurations that are still relatively complicated and cumbersome, and thus relatively expensive as commercial products. Moreover, QCLs often require cooling, or only work in the pulsed mode.

Another type of laser, the "Raman fiber lasers (RFLs)" are particularly attractive sources of high intensity light at nearly arbitrary wavelengths because the gain in the fiber is achieved by stimulating coherent radiation via phonon shifts in the glasses used to make the fibers, as opposed to the fixed energy transitions in atoms or rare-earth ions used for traditional fiber amplifiers and lasers. However, work on narrow linewidth (NLW) laser sources has focused on RFLs in the near infrared (IR) regions of the spectrum, and there is no work to date on the demonstration of narrow linewidth mid-infrared RFL sources, or on the effective tuning of such RFL sources for applications such as molecular sensing or various other applications.

Improved laser technologies are desired. In particular, narrow linewidth, optionally tunable, mid-infrared Raman fiber lasers, and methods of manufacturing such lasers may prove useful for a variety of emerging laser applications.

SUMMARY

Improved Raman Fiber Laser (RFL) generators, methods of manufacturing improved RFL generators, and methods of using improved RFL generators are disclosed. Some example RFL generators may include a mid-infrared fiber, comprising, e.g., one or more of a tellurite glass, a chalcogenide glass or a fluoride glass. A phase-shifted fiber Bragg grating, e.g., a π phase-shifted fiber Bragg grating, may be inscribed in the fiber. A pump laser generator may be coupled with the fiber in order to supply a pump laser to the fiber. When stimulated by the pump laser, the RFL generator may emit an output laser having a mid-infrared wavelength. A tuner described herein may be used to tune the output laser, and some example methods of using improved RFL generators disclosed herein may include, e.g., tuning an RFL generator using the techniques described herein.

Some example methods of manufacturing improved RFL generators may include inscribing a phase-shifted fiber Bragg grating in a mid-infrared fiber, such as a fiber comprising a tellurite glass, a chalcogenide glass, or a fluoride glass. The inscribing may comprise, e.g., positioning a phase mask along the fiber, and using a precision motion control system to scan an inscription laser beam along the phase mask. To generate a π phase-shifted fiber Bragg grating, methods may block the inscription laser beam and move the fiber one wavelength, when the inscription laser beam reaches a middle of the phase mask. The inscription laser beam may be generated as described herein, e.g., the inscription laser beam may be expanded and shaped using a beam expander and a cylindrical lens. Further aspects and embodiments are described in detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein:

FIG. 1 illustrates an example improved Raman Fiber Laser (RFL) generator.

FIG. 2 illustrates an example section of a fiber comprising a fiber Bragg grating.

DETAILED DESCRIPTION

Figure 3:
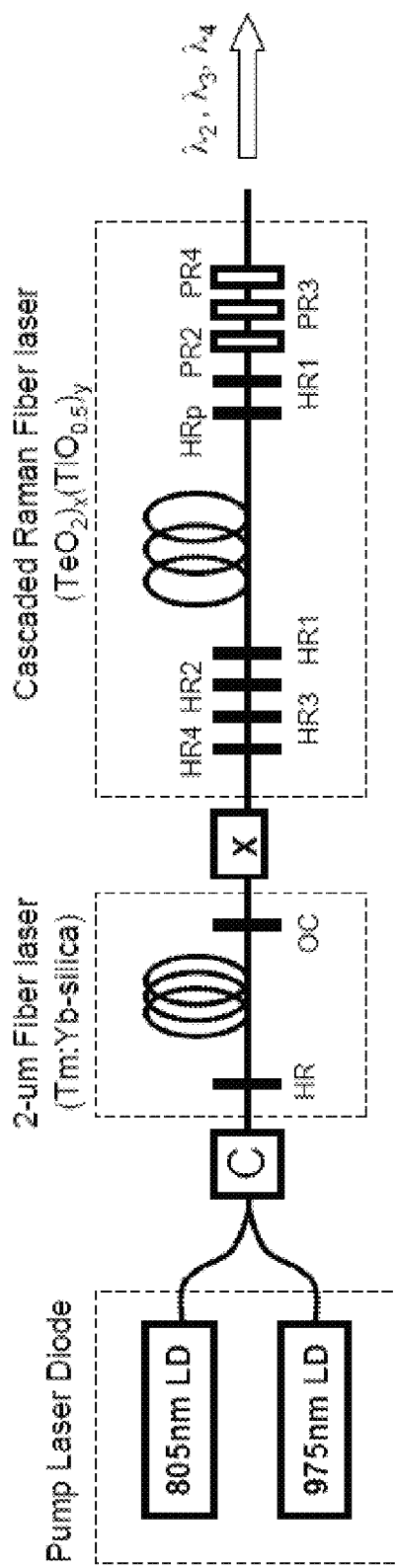
FIG. 3 illustrates another example RFL generator.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

The term "laser" is often used to refer to both the apparatus that produces a laser beam, as well as the laser beam itself. For the sake of clarity, the term "laser generator" will be used herein to refer to a device that produces a laser beam, and the terms "laser" or "output laser" will be used to refer to laser beams produced by a laser generator.

FIG. 1 illustrates an example RFL generator 100, in accordance with at least some embodiments of this disclosure. RFL generator 100 includes a controller 140, a pump laser generator 110, a fiber 120, and a tuner 130. The fiber 120 includes a phase shifted fiber Bragg grating 121 inscribed therein. The fiber 120 is surrounded by a protective sheath 122. The RFL generator 100 is illustrated inside an instrument 150.

In FIG. 1, the controller 140 may activate the pump laser generator 110 to supply pump laser 111 to fiber 120. When stimulated by the pump laser 110, the fiber 120 may emit an output laser 123 having properties which are generally a product of the pump laser 111, the material of the fiber 120, the properties of the phase shifted fiber Bragg grating 121, and the tuning state of the fiber 120 as controlled by the tuner 130. For example, in some embodiments, the output laser 123 may have a mid-infrared wavelength of 2.0-16.0 microns. The term "mid-infrared" is defined herein as light with wavelength of 2.0-16.0 microns. In some embodiments, the output laser 123 may have a mid-infrared wavelength of 2.5-5 microns. In some embodiments, the output laser 123 may have a mid-infrared wavelength of 6-10 microns. In some embodiments, the output laser 123 may have an output power level between 1 mW and 10 mW. In other embodiments, the output laser 123 may have an output power level at or above 100 mW. The output laser 123 may optionally also have any of the various other properties described herein.

RFL generator 100 may, but need not necessarily, be adapted inside, attached to, or otherwise integrated with instrument 150. Instrument 150 may include any instrument. For example, in some embodiments, instrument 150 may comprise a molecular sensing instrument. RFL generator 100 may prove particularly useful in sensing of trace levels of formaldehyde, e.g., in quantities less than one part per billion (ppb), or sensing of methane, moisture, or hydrogen peroxide; and so instrument 150 may be adapted for such measurements in some embodiments. In other embodiments, instrument 150 may comprise yet another laser generator, and the output laser 123 produced by RFL generator 100 may serve as a pump laser for the instrument 150. In further embodiments, instrument 150 may comprise a health care monitoring instrument. In still further embodiments, instrument 150 may comprise an infrared countermeasure (IRCM) instrument or a direct detection Light Detection and Ranging (LIDAR) instrument.

When integrated with instrument 150, RFL generator 100 may be sized and shaped to physically attach to instrument 150, e.g., by fitting inside a cavity within instrument 150. Controller 140 may include an interface which connects to instrument 150, to thereby allow control of RFL generator 100 via instrument 150 controls and electronics.

Controller 140 is illustrated as coupled with pump laser generator 110 and tuner 130. Controller 140 may comprise electronics adapted to operate pump laser generator 110 and tuner 130, e.g., by receiving control inputs from a human operator or from instrument 150, and sending corresponding control signals to pump laser generator 110 and tuner 130. In some embodiments, separate controllers may be used to control pump laser generator 110 and tuner 130. In some embodiments, RFL generator 100 need not include controller 150. Instead, pump laser generator 110 and tuner 130 may be attached to external controllers, e.g., controllers included in instrument 150, wherein the external controllers are adapted to operate pump laser generator 110 and tuner 130.

In some embodiments, fiber 120 may comprise a narrow linewidth mid-infrared fiber. The term "mid-infrared fiber" as used herein includes fibers made from tellurite glass, chalcogenide glass, and/or fluoride glass, as well as any other fibers, whether now known or developed in the future, with light transmission properties similar to tellurite, chalcogenide, and/or fluoride fibers. Any of the various forms of tellurites, chalcogenides, or fluorides may be used in fiber 120, e.g., an AsS type chalcogenide or an AsSe type chalcogenide may be used, or a tellurite made from 50% $TeO_2$ and 50% $TlO_{0.5}$ may be used. Another candidate material from which fiber 120 may be made is ZBLAN. In some embodiments, fiber 120 may be a rare-earth doped fiber. The term "narrow linewidth" as used herein includes linewidths of 100 MHz or less.

The length of fiber 120 may be a function of desired properties of output laser 123. For broadband high power mid-infrared output lasers 123, long mid-infrared fibers (e.g., 2 m to 10 m long) may be used, along with appropriate broadband FBGs 121 inscribed at the two ends of these fibers, as high reflectors (HRs) and output couplers (OCs). For narrow linewidth tunable lasers, in appropriately selected low-loss mid-infrared fibers (tellurites, chalcogenides, or fluorides) of moderate lengths (e.g. 10-40 cm) may be used, and fibers anywhere from 10-200 centimeters long may be appropriate for some embodiments.

Table 1 gives values of Raman gain (at 2.5 micrometers) and Raman shifts in several mid-infrared glasses (tellurites, chalcogenides, and ZBLAN), along with the transparency window of these glasses. The data for silica glass has been added for reference to give perspective on the Raman gains in the various mid-infrared glasses. As seen in Table 1, the peak Raman gain in ZBLAN is a factor of 2 larger than that of silica, while the peak Raman gain coefficients in several tellurite and some chalcogenide glasses (AsS) are nearly an order of magnitude higher than that of the peak Raman gain coefficient in silica. On the other hand, the Raman gain in the AsSe chalcogenide family of glasses is nearly two orders of magnitude higher than that of silica. The AsSe chalcogenide family of glasses is therefore considered a favorable candidate for fiber 120 in high average power multi-Stokes Raman mid-infrared fiber laser generators, e.g., for IRCM applications, as well as in high power multi-Stokes-shifted broad bandwidth Raman pump laser generators, to pump several of the narrow linewidth Distributed Feedback (DFB) RFLs because of the anticipated relatively low threshold pump powers, as described herein. Note that the spectral linewidth of the DFB RFLs is not dependent on the linewidth of the pump laser (although the conversion efficiency has a secondary dependence on the pump linewidth), but is primarily dependent on the bandwidth of the phase-shifted fiber Bragg gratings used in the RFLs.

TABLE 1

| Glass | Estimated Peak Raman Gain (m/W) | Raman Shift ($cm^{-1}$) | Raman Gain Bandwidth ($cm^{-1}$) | Transparency Window μm |
|---|---|---|---|---|
| Silica | $0.36 \times 10^{-13}$ | 400 | 200 | 0.35-2 |
| Tellurite | $2.31 \times 10^{-12}$ | 741 | 300 | 0.5-4.5 |
| Chalcogenide (AsS) | $3.42 \times 10^{-12}$ | 347 | 50 | 1.5-6.5 |
| Chalcogenide (AsSe) | $1.38 \times 10^{-11}$ | 236 | 50 | 1.5-9 |
| ZBLAN | $0.68 \times 10^{-13}$ | 300 | 400 | 0.22-4.5 |

The choice of fiber 120 to be used for a specific RFL application, e.g., a specific instrument 150, may be based, in part, on the availability of robust near-single mode fibers, and optionally also on the magnitude of the peak Raman gain (wavelength dependent) and the desired value of the Raman shifts in these fibers.

Another parameter relevant to the selection of material used for fiber 120 in the design of RFL generator 100 is the maximum refractive index change achievable in the core of fiber 120, since it determines the depth of the refractive index modulation (and the coupling coefficient) achievable in fiber Bragg gratings (FBGs) 121 inscribed in the fiber 120. Table 2 depicts information on the index modulation achievable and the corresponding coupling coefficient achievable in FBGs made with these fiber 120 materials, along with the data for germanosilicate fibers.

TABLE 2

| Glass | Refraxtive index modulation $\Delta n$ | $\kappa$ (m$^{-1}$), coupl. coeff. at 3 μm | Illumin. Wavelength (nm) | Peak Illumination Intensity or CW Powers Used |
|---|---|---|---|---|
| Ge-silicate | $10^{-4}$ | 125.7 | 334 | $10^3$ (W/cm$^2$) |
| Tellurite | $10^{-2}$ | 741 | 800 | $10^{11}$ (W/cm$^2$) |
| Chalcogenide (AsS) | $2 \times 10^{-2}$ | 2500 | 532 | 5 (mW) |
| Chalcogenide (AsSe) | $10^{-2}$ | 12600 | 633 | 3 (mW) |

Note that much higher coupling coefficients are readily achievable in mid-infrared fibers relative to those in germanosilicate fibers, indicating large coupling coefficients in FBGs inscribed in mid-infrared fibers. FBGs with large coupling coefficients, in turn, advantageously require lower pump powers of pump laser 111, as described herein.

With regard to the design of fiber 120 and FBG 121 inscribed therein, FIG. 2 illustrates an example section of a fiber comprising a fiber Bragg grating, in accordance with at least some embodiments of this disclosure. In general, the FBG 121 includes a plurality of planar inscriptions in the fiber 120, which are generally oriented perpendicular to the length of the fiber 120, as illustrated in FIG. 1 and FIG. 2. The inscriptions may comprise modulations of the core refractive index in fiber 120, e.g., slightly altered or differently oriented fiber molecules, which are oriented differently from the non-inscribed portions of fiber 120. The inscriptions may be spaced a distance apart from one another, which distance may be tailored to produce a desired distributed feedback (DFB) effect, as well as a desired phase shift for the FBG 121.

The theoretical analysis of DFB RFL generators is generally based on a coupled wave equation formalism with regard to the pump, forward, and backward Stokes waves. We developed an analytical closed form approximate model based on the transfer matrix method (TMM) to estimate the threshold pump requirements and optimal fiber lengths for phase-shifted DFB RFLs. The transfer matrix method TMM is a powerful, but simpler tool, for preliminary analysis of such periodic structures. Our modified TMM shown here is derived from the traditional coupled wave equations in the steady state regime assuming that the pump power is not depleted significantly.

Implementation of the TMM in DFB RFLs requires segmenting the fiber length into several sections, as shown in FIG. 2, with the phase-shift incorporated in one of the central sections. In each section, $z_K$, the parameters are treated as constants. A 2×2 transfer matrix is used to relate the forward and backward propagating wave amplitudes in each section to the next one and to the pump power in each subsection.

$$\begin{bmatrix} A_f(z_{K+1}) \\ A_b(z_{K+1}) \end{bmatrix} = F(z_{K+1} | z_k) \begin{bmatrix} A_f(z_K) \\ A_b(z_K) \end{bmatrix}$$

where $A_f$ is the amplitude of the forward Stokes wave, and $A_b$, that of the backward Stokes wave. In this case, the complex elements of the 2×2 transfer matrix $F(Z_{k+1}|z_k)$ are given by:

$$F_{11} = \frac{1}{r}\left[e^{iq\Delta z} - \frac{r_B}{r_A}e^{iq\Delta z}\right]$$

$$F_{12} = \frac{r_B}{r}[e^{iq\Delta z} - e^{iq\Delta z}]$$

$$F_{21} = \frac{1}{rr_A}[e^{iq\Delta z} - e^{iq\Delta z}]$$

$$F_{22} = \frac{1}{r}\left[e^{iq\Delta z} - \frac{r_B}{r_A}e^{iq\Delta z}\right]$$

Where:
$\Delta z = z_{k+1} - z_k$ is the subsection length, $$r_A = \frac{\kappa}{q + i(\alpha/2 + i\delta_f)}$$

$$r_B = \frac{q + i(\alpha/2 + i\delta_b)}{\kappa}$$

$$\alpha = g_s|A_P|^2 - \alpha_s\delta_j = \delta\beta + y_z(2|A_p|^2 + |A_q|^2 + 2|A_b|^2)$$

$$\delta_b = \delta\beta + \gamma_i(2|A_p|^2 + 2|A_f|^2 + |A_b|^2)$$

$$r = 1 + \frac{r_B}{r_A}$$

$$q = \frac{-(\delta_b - \delta_f) \mp \sqrt{(\delta_b - \delta_f)^2 - 4[(\alpha/2 + i\delta_f)(\alpha/2 + i\delta_b) + \kappa^2]}}{2}$$

where $A_p$ is the amplitude of the pump wave.

The fields may be normalized so that $I_{p,f,b} = |A_{p,f,b}|^2 = P_{p,f,b}/A_{eff}$, where, $A_{eff}$ is the effective mode area for the fiber. The Raman gain coefficients for pump and Stokes waves are given by $g_p$ and $g_s$, respectively, and related through $g_P = g_S \cdot \lambda_S/\lambda_P$. The nonlinear parameter $\gamma_s$ is related to the nonlinear refractive index, $n_2$, through the relationship $g_S = 2\lambda n_2/\lambda_S$ the wavelengths of the pump and Stokes waves are denoted by) $\lambda_p$ and $\lambda_s$ respectively, and $\delta\beta$ represents the detuning of the Raman laser wavelength from the central Bragg wavelength ($\lambda_B$).

At the location of the phase shift in the grating structure, the phase shift matrix can be applied to the TMM model as a simple "static" built-in grating phase shift, as follows:

$$p(\theta) = \begin{bmatrix} e^{i\theta} & 0 \\ 0 & e^{-i\theta} \end{bmatrix}$$

where $\ominus$ is the designed grating phase shift. The boundary conditions at the left and right ends of fiber (l=0 and l=L, respectively) for the Stokes modes are simply:

$$A_f(0) = r_1 A_b(0)$$

$$A_b(L) = r_2 A_f(L)$$

where $r_1$ and $r_2$ are the reflection coefficients at the left and right end of fiber, respectively.

Using the TMM model with the above boundary conditions, the parameters $\alpha_{eff}$ and $\delta\beta_{eff}$ can be obtained for a specific mode in a chosen PS-FBG. Here $a_{eff}$ and $\delta\beta_{eff}$ are the effective values of loss/gain, and the detuning factors respectively, that satisfy our matrix equation with the stated boundary conditions. The pump threshold powers for each resonant mode (lowest and higher orders) of the active PS-FBG can next be computed by inserting $\alpha e_{ff}=\alpha_{th}$ into the following equation:

$$P_{th} = \frac{(2\alpha_{eff} + \alpha_{LS})A_{eff}}{g_s},$$

as shown herein.

In some embodiments, a more advanced model may incorporate the effect of SBS (stimulated Brillouin scattering) to estimate optimum linewidths and pump parameters in our DFB RFLs. The fundamental features of a "basic" DFB-RFL can be described by nonlinear coupled mode differential equations for the amplitudes of the pump ($A_p$), forward Stokes ($A_f$), and backward Stokes ($A_b$) waves. Assuming group velocity dispersion (GVD) is negligible and the slowly varying amplitude approximation (SVEA) is valid, the three coupled differential equations can be written as:

$$\frac{\partial A_p}{\partial z} + \frac{1}{v_p}\frac{\partial A_p}{\partial t} =$$
$$-\frac{g_P}{2}(|A_f|^2 + |A_b|^2)A_p + i\gamma_p(|A_p|^2 + 2|A_f|^2 + 2|A_b|^2)A_p - \frac{\alpha_{lP}}{2}A_p$$

$$\frac{\partial A_f}{\partial z} + \frac{1}{v_s}\frac{\partial A_f}{\partial t} = \frac{g_s}{2}(|A_p|^2)A_f + i\kappa A_b + i\delta\beta A_f +$$
$$i\gamma_s(2|A_p|^2 + |A_f|^2 + 2|A_b|^2)A_f - \frac{\alpha_{lS}}{2}A_f$$

$$\frac{\partial A_b}{\partial z} + \frac{1}{v_s}\frac{\partial A_b}{\partial t} = \frac{g_s}{2}(|A_p|^2)A_b + i\kappa A_f + i\delta\beta A_b +$$
$$i\gamma_s(2|A_p|^2 + 2|A_f|^2 + |A_b|^2)A_b - \frac{\alpha_{lS}}{2}A_b$$

Here gp and gs are the Raman gain coefficients for pump and Stokes waves and they are related by $g_P=g_S\cdot\lambda_S/\lambda_P$. The nonlinear coefficients are defined as $\gamma_s=2\pi n_2/\lambda_S$ and $\gamma_P=\gamma_s(\lambda_S/\lambda_P)$, where n2 is the nonlinear refractive index (resulting from Kerr effect), $\kappa=\pi n/\lambda_B$ is the FBG coupling coefficient (as before, $\Delta n$ is the index modulation and $\lambda_B$ is the Bragg wavelength), $\delta\beta$ is detuning of the Stokes wavelength from $\lambda_B$, and $\alpha_{LS}$ and $\alpha_{LP}$ are the linear absorption coefficients of the fiber for the Stokes and pump wavelengths, respectively. In advanced models, additional effects may be included in these coupled equations, such as a nonlinear term to account for the role of SBS at high pump powers, particularly for large values of $\kappa$ and L (L=the total length of the FBG and the DFB-RFL) corresponding to RFLs operating at linewidths of <100 MHz, and study these effects as a function of various parameters including high values of pump power (large values of $A_p$) and L, the length of the fiber in the DFB-RFLs. Even though we anticipate the role of SBS to be small even for the case of ultra-narrow linewidths for DFB-RFLs of total length of <1 m, it may be desirable to estimate the role of SBS as a function of the above defined parameters (pump power, RFL linewidth, fiber material, and fiber length) quantitatively. Note that the TMM model described herein, which was used to calculate pump thresholds and modal discrimination for various fibers and DFB-RFL lengths, was derived from the three coupled equations described above.

FIG. 3 illustrates another example RFL generator, in accordance with at least some embodiments of this disclosure. FIG. 3 is a schematic diagram of an example broadband cascaded RFL (caRFLs) modeled for high power mid-infrared laser applications. FIG. 3 illustrates the case of a 2-μm Tm fiber laser pump and a tellurite Raman gain fiber. $HR_p$ represents a high reflectivity FBG at the pump wavelength, whereas $HR_n$ and $PR_n$ represent highly reflective and partially reflective output couplers at the various Stokes wavelengths $\lambda_n$ for an optimized multi-wavelength mid-infrared laser output (e.g., at 3.8 μm and 5.2 μm). Embodiments may provide a continuous wave (CW) RFL generator, and or a cascaded multi-Stokes CW RFL generator.

With regard to the design of pump laser generator 110, FIG. 4A, FIG. 4B, FIG. 4C, FIG. 4D, FIG. 4E, and FIG. 4F illustrate example pump powers for pump laser 111, in accordance with at least some embodiments of this disclosure. For our calculations of pump thresholds and output powers achievable from RFL generator 100, we performed some numerical calculations for phase-shifted RFL generators based on specific chosen lengths of fiber 120 based on chalcogenide and tellurite glasses. Based on the most popular fiber 120 choices obtainable commercially (IRFlex®, Coractive®, and NP Photonics®), we used a numerical aperture (NA) of 0.15, core refractive indices of 2.4 and 2.1 respectively, nonlinear refractive indices of $n_2=1.1\times10^{-17}$ and $35\times10^{-20}$ m²/W respectively, and effective areas of $A_{eff}=2.5$ and 10.6 μm² respectively, for these simulations. In order to obtain more accurate results and fix the validity of TMM in our particular structures, the length of cavity was divided into 200 segments.

Figure 4A:
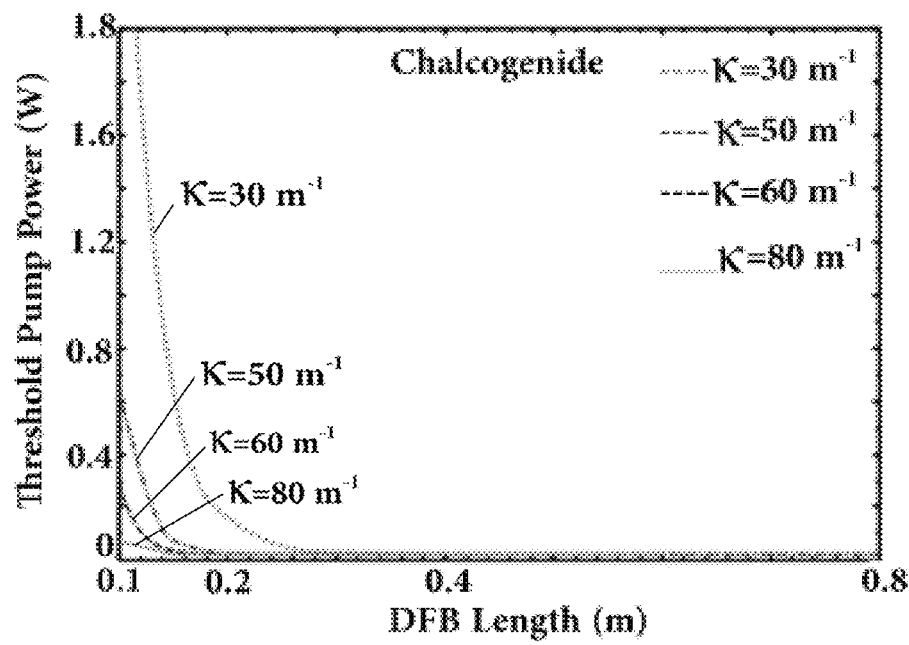
FIG. 4A, FIG. 4B, FIG. 4C, FIG. 4D, FIG. 4E, and FIG. 4F illustrate example pump powers for pump laser for use with an improved RFL generator.
Figure 4B:
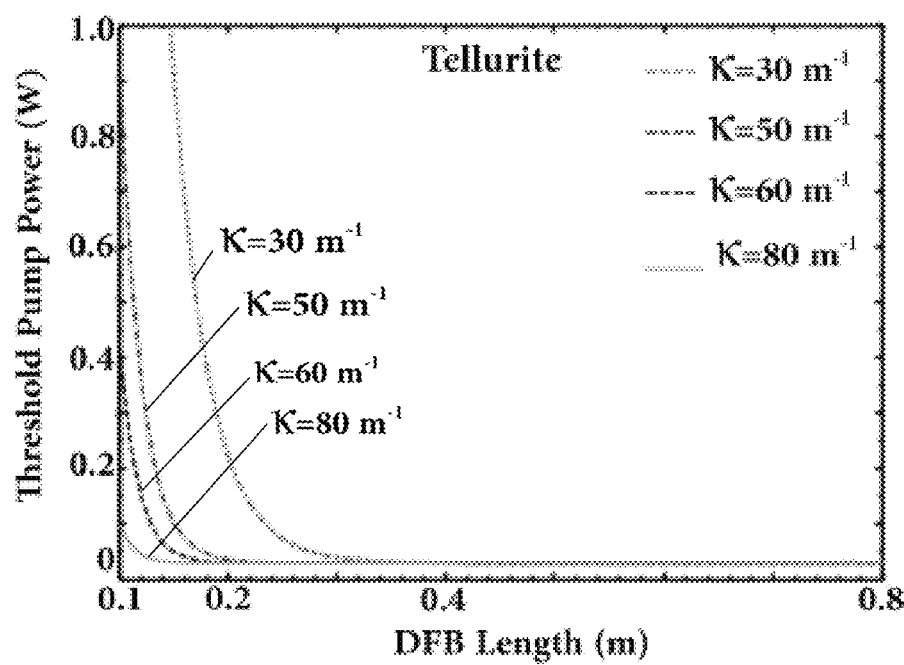

Results computed for the threshold pump power of the main mode, $P_{th0}$, are plotted in FIG. 4A and FIG. 4B for different values of phase shifted DFB lengths and coupling coefficients for the above-described chalcogenide and tellurite fibers, respectively. It is seen that for moderate lengths of fiber 120 (e.g., 20 cm to 40 cm), the estimated threshold pump powers, $P_{th0}$, for the lowest order mode are reasonable (between 500 mW and 2 Watts), in both chalcogenide and tellurite fibers, and as expected, the threshold pump power decreases with increasing either the fiber 120 length or the coupling coefficient. Therefore in some embodiments, the pump laser 111 supplied by the pump laser generator 110 may have a pump power between 50 mW and 500 Watts.

Figure 4C:
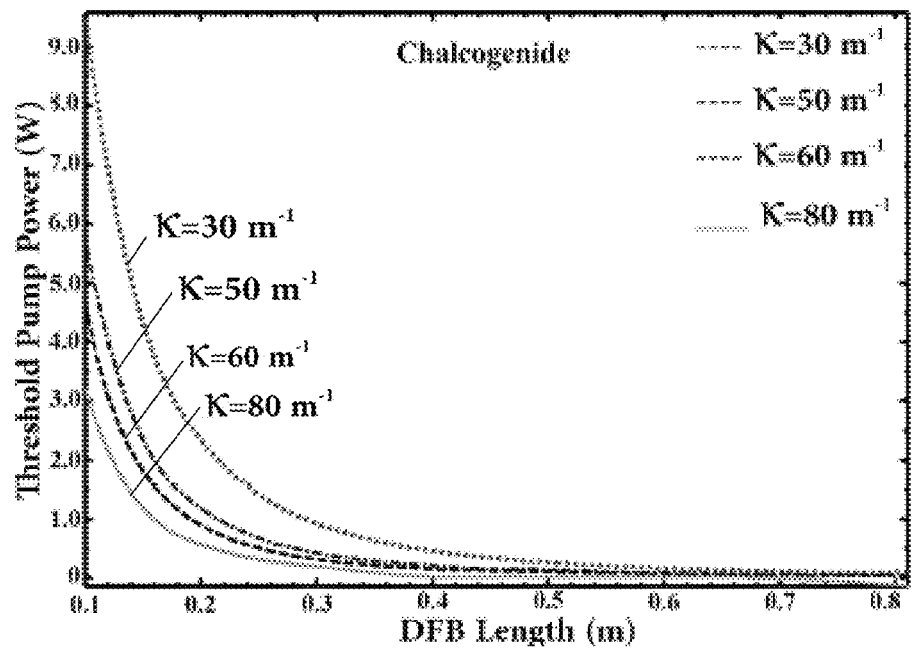
Figure 4D:
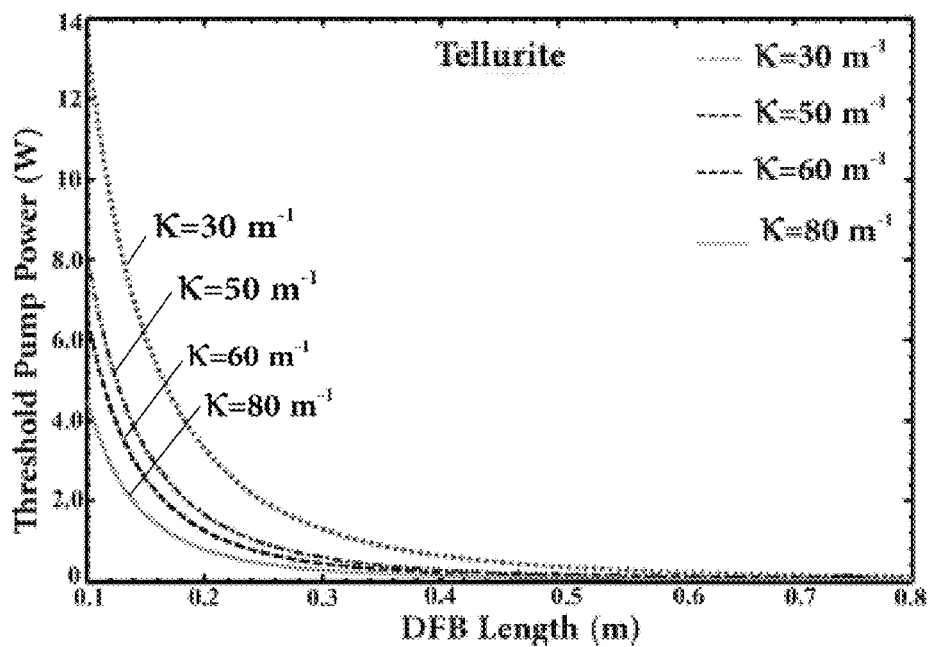

Threshold pump powers produced by pump laser generator 110, may also include pump powers for the next mode, Pth1, namely for the first order side mode, since side mode suppression is very important for single mode operation. As seen in FIGS. 4C and 4D, $P_{th1}$ also decreases with increasing fiber length and coupling coefficient. FIGS. 4A, 4B, 4C, and 4D, exhibit that $P_{th0}$ and $P_{th1}$ are independent of L and the coupling coefficient, for large values of L. For example, for L>0.3 m for chalcogenide and for L>0.4 m for tellurite fibers, the dependency of $P_{th0}$ and $P_{th1}$ on the coupling coefficient and L values is quite weak. In other words in some embodiments it may not be preferable to choose fiber lengths L>0.4 m.

Figure 4E:
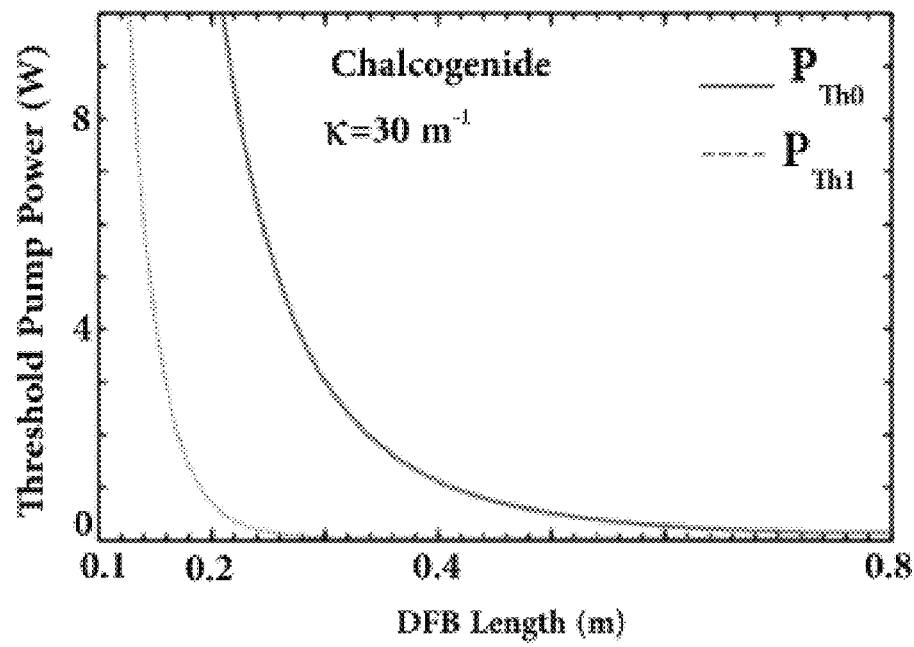
Figure 4F:
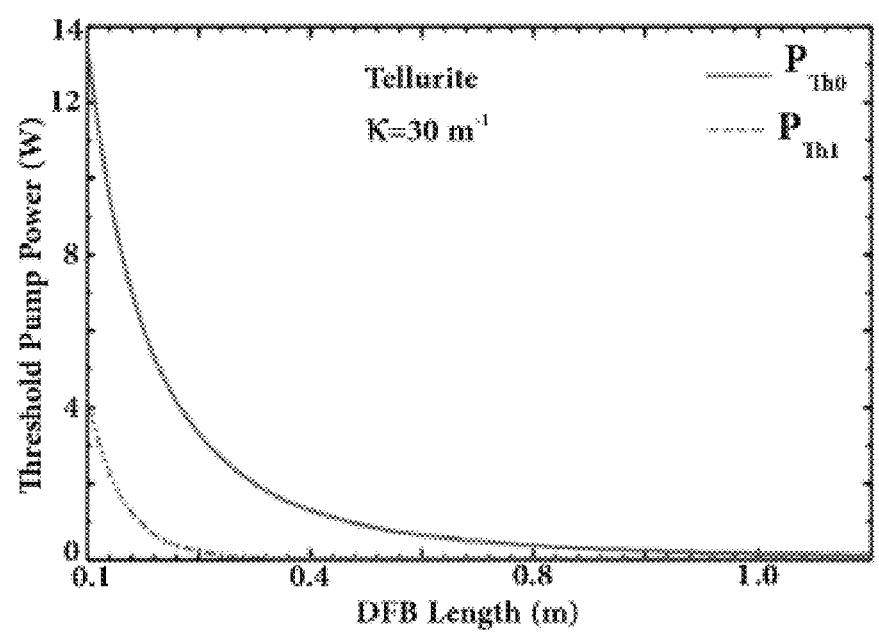

For comparison, the threshold pump power of the main and side modes, $P_{th0}$ and $P_{th1}$, of chalcogenide and telluride DFB RFLs are shown in FIGS. 4E and 4F, respectively. For both of these mid-infrared glasses, separation of the threshold power for the main and the first modes decreases when the length of the fiber 120 is increased, once again suggesting the use of shorter fibers with higher coupling coefficients.

The above computations imply that for true single mode operation, structures with low threshold pump power and high separation of the main and the first threshold pump powers may be selected. For example, if we select a fiber of length, L=11 cm the threshold power of main mode and separation for $\kappa$=30, 50, 60, 80 m$^{-1}$ are $P_{th0}$=2.2, 0.4, 0.172, 0.043 W respectively, and $\Delta P_{th}$=5.796, 4.306, 3.595, 2.5143 W for chalcogenide and they are $P_{th0}$=3.094, 0.571, 0.259, 0.064 W, $\Delta P_{th}$=8.164, 6.047, 4.906, 3.488 W for tellurite.

Figure 5A:
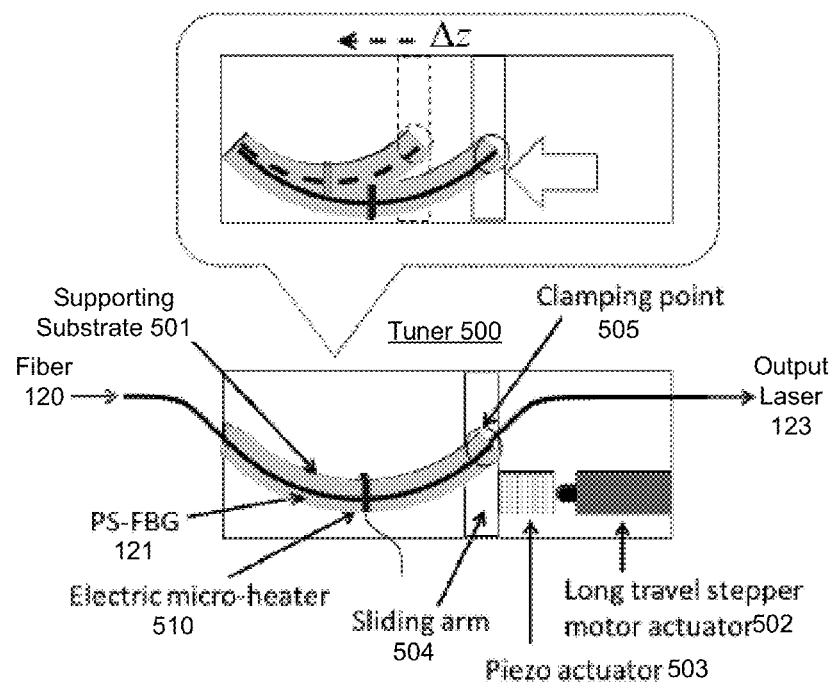
FIG. 5A, FIG. 5B, and FIG. 5C illustrate an example tuner and operation thereof.
Figures 5B, 5C:
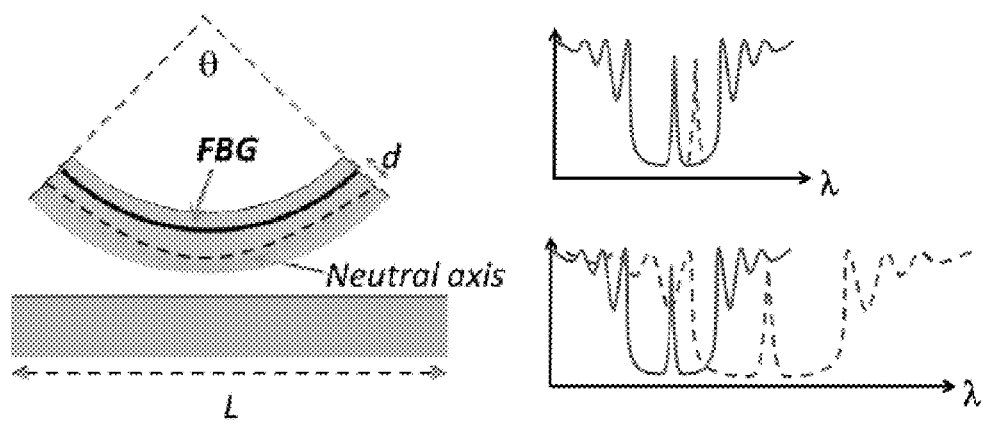

FIG. 5A, FIG. 5B, and FIG. 5C illustrate an example tuner and operation thereof, in accordance with at least some embodiments of this disclosure. FIG. 5A illustrates tuner 500 at bottom, below a magnified view showing bending of the fiber. In FIG. 5A, fiber 120 passes through tuner 500. Fiber 120 may be protected by a sheath 122 such as illustrated in FIG. 1, however sheath 122 is not shown in FIG. 5. The phase shifted fiber Bragg grating (PS-FBG) 121 is positioned inside tuner 500, and the output laser 123 exits fiber 120 after fiber 120 exits the tuner 500. Tuner 500 is adapted to modify the fiber 120 comprising the phase-shifted fiber Bragg grating 121 in order to tune the output laser 123.

Tuner 500 comprises a supporting substrate 501, a long travel stepper motor actuator 502, a piezo actuator 503, a sliding arm 504, a clamping point 505, and an electric micro-heater 510.

Depending on the desired configuration, tuner 500 may include a heat-based tuning mechanism such as electric micro-heater 510, or a fiber bending-based tuning mechanism including elements 501-505, or both. Electric micro-heater 510 comprises a heating element near the fiber 120 and phase-shifted fiber Bragg grating 121, wherein the heating element modifies phase shift and Bragg period produced by the fiber Bragg grating 121 through a thermo-optic effect.

A fiber bender may comprise supporting substrate 501, long travel stepper motor actuator 502, piezo actuator 503, sliding arm 504, and clamping point 505, which are collectively adapted to bend the fiber 120 and the phase-shifted fiber Bragg grating 121 into a variable radius arc shape. Supporting substrate 501 may be positioned along the fiber 120 comprising the phase-shifted fiber Bragg grating 121 in order to support the fiber 120 during bending thereof.

FBGs 121 can be tuned by varying the temperature (thermo-optic effect) or mechanical strain (photo-elastic effect). Mechanical tuning methods may rely on bending, stretching, or compressing the FBG 121 using manual, motorized or piezo-actuators. While tuning efforts have been dedicated to the development and analysis of mechanical tuning of uniform FBGs, this disclosure appreciates that similar methods can be used to tune the transmission peak of a PS-FBG 121 and therefore the corresponding RFL generator, such as RFL generator 100.

In some embodiments, a pi-phase shifted FBG 121, and the corresponding output laser 123, may be tuned using a combination of: (a) a bending method and (b) temperature control of the pi-phase shifted region, as illustrated in FIG. 5A. Since most "soft glass" Mid-infrared fibers 120 are relatively fragile (compared to silica fibers), the bending technique has several advantages over "the more traditional" axial compression/stretching techniques.

In some embodiments, supporting substrate 501 may comprise a cylindrical plastic cover. Supporting substrate 501 may reduce the possibility of breakage during gradual bend-induced stretching or compression. Supporting substrate 501 may furthermore reduce sensitivity to vibrational noise, because the vibrations are dampened by the substrate 501. Supporting substrate 501 may furthermore lead to higher uniformity in strain over entire length of the FBG 121.

In some embodiments, supporting substrate 501 may comprise a hard plastic material formed into a bendable beam support structure. The PS-FBG 121 section of fiber 120 maybe embedded in this bendable beam support structure. The bendable beam support structure may be attached to a specially designed frame so that it can be bent into an arc shape of varying radius using a horizontal displacement ($\Delta z$), as depicted in the top magnified portion of FIG. 5A. One side of supporting substrate 501 may be attached to a fixed frame at the left side of FIG. 5A, and an opposite side of supporting substrate 501 may be clamped at clamping point 505 to a sliding arm 504 controlled by a long travel stepper motor actuator 502 and a short-travel piezo-actuator 503. Using these actuators, the location of the sliding arm 504, and thus the radius of the supporting substrate 501 and fiber 120 is controllable with ultrahigh (micron) precision.

Changes along the z-axis are translated to variation of the supporting substrate 501 and fiber 120 length according to $\Delta z = L(1-\text{sinc}(\theta/2))$, where L is the length of the straight supporting substrate 501 and $\theta$ is the arc angle, as illustrated in FIG. 5B. The change in the Bragg wavelength ($\lambda B$) defines the spectral shift $\Delta\lambda$ (and the location of the transmission peak for symmetric $\pi$-phase shifted FBGs), and is inversely proportional to:

$$L:\Delta\lambda = (1-\rho_e)\left(d.\frac{\theta}{L}\right)\lambda_B$$

where d is the offset of FBG axis from the neutral plane. As shown schematically in FIG. 5C (bottom graph), the strain induced change over the length of the FBG will also result in expansion and contraction of the entire transmission spectrum. In particular, for sensing applications the stepper motor 502 may tune the output laser 123 wavelength to the absorption line of a target molecule (such as formaldehyde) and the piezo-actuator 503 may be used to modulate the output laser 123 wavelength to enable the use of ultrahigh-sensitivity derivative measurement techniques. In addition to this tuning mechanism, a micro-heater 510 comprising a thin resistive wire turned around the center of the PS-FBG 121, at the location of the pi-phase shifter period, may be used to fine tune the alignment of the transmission peak relative to the stop-band of the FBG 121, shown in FIG. 5A.

Using tuning techniques described herein, some embodiments may achieve tuning ranges in excess of 90 nm. In some embodiments, the tuner 500 may be adapted to tune the output laser 123 over at least a 10 GHz spectral range. Alternatively, the tuner 500 may be adapted to tune the output laser 123 in a coarse tuning range of less than 5 nm and a fast tuning range of greater than 100 GHz. In some embodiments, the tuner 500 may be adapted to tune the output laser 123 with a modulation rate larger than 1 KHz.

Figure 6:
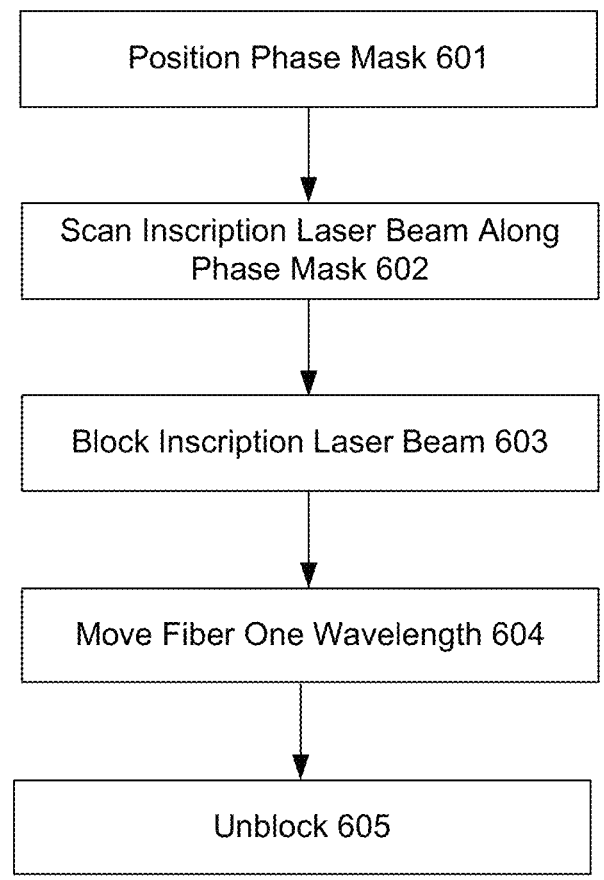
FIG. 6 illustrates an example method to manufacture an improved RFL generator.

FIG. 6 illustrates an example method to manufacture an improved RFL generator, in accordance with at least some embodiments of this disclosure. Manufacture may comprise inscribing a phase-shifted fiber Bragg grating 121 in a mid-infrared narrow linewidth fiber 120. The fiber 120 may comprise, e.g., a tellurite glass, a chalcogenide glass, or a fluoride glass as described herein. The inscribing process may comprise positioning a phase mask along the fiber at operation 601, and using a precision motion control system to scan an inscription laser beam along the phase mask, at operation 602. In this manner, a plurality of gratings may be inscribed in the fiber 120. To generate a phase-shifted fiber Bragg grating, e.g., a π phase-shifted fiber Bragg grating, the inscription laser beam may be blocked at operation 603, and the fiber 120 may be moved with respect to the phase mask by one output laser 123 wavelength (or some fraction of a wavelength for any desired phase shift) when the inscription laser beam reaches a middle of the phase mask, at operation 604. The inscription laser beam may be unblocked at operation 604, and the inscription laser beam may continue to scan along the phase mask, such as at operation 602. Further aspects and details of manufacturing an appropriate phase-shifted fiber Bragg grating 121 are described below.

In a phase-shifted FBG (PS-FBG), one or more phase shifts are introduced across the FBG 121, whose location and magnitude are selected to generate a transmission spectrum that comprise one or more peaks within the stop-band of the FBG 121. The special case in which one period in the middle of the FBG (or near the middle, with an appropriately targeted offset) is n-phase shifted, and results in a narrow central transmission peak (a dip in the middle of the reflection spectrum). When inscribed on an active (or Raman gain) fiber, such a π-PS-FBG is ideal for generating single mode narrow linewidth laser emissions. The location of the transmission peak within the stop-band of the FBG can be tuned by changing the magnitude of the phase shift in the middle of FBG 121. As such, in a PS-DFB-RFL generator 100 constructed with such a n-PS-FBG 121, the wavelength of the resulting output laser 123 can be tuned simply by changing the length or refractive index of the phase shifted period. For example, using a narrow wire as a localized heating element in the middle of FBG 121 can tune the phase shift of the corresponding period through the thermo-optic effect, as described herein.

In some embodiments, FBGs 121 may be fabricated by periodic modulation of the core refractive index in a fiber 120 using the photorefractive effect. The periodic modulation can be generated using a phase-mask, a holographic method, or by step-wise motion of the fiber 120 through the waist of a focused laser beam. In a uniform FBG, the refractive index profile along the length of the grating is given by: $\delta n_{eff}(z) = \Delta_{eff}[1+\cos(\kappa z)]$ where $\Delta n_{eff}$ is refractive index modulation averaged over one period, and is related to the coupling coefficient (κ) discussed above via the expression, $\kappa = \pi \Delta n_{eff}/\lambda$. The average photo-induced refractive index change estimated for a wavelength of 3 microns for different values of κ are listed in Table 3, below.

TABLE 3

| κ (m$^{-1}$) | Average refractive index change, $\Delta n_{eff}$ |
|---|---|
| 30 | 0.0002826 |
| 50 | 0.000471 |
| 60 | 0.0005652 |
| 80 | 0.0007536 |

Figure 7:
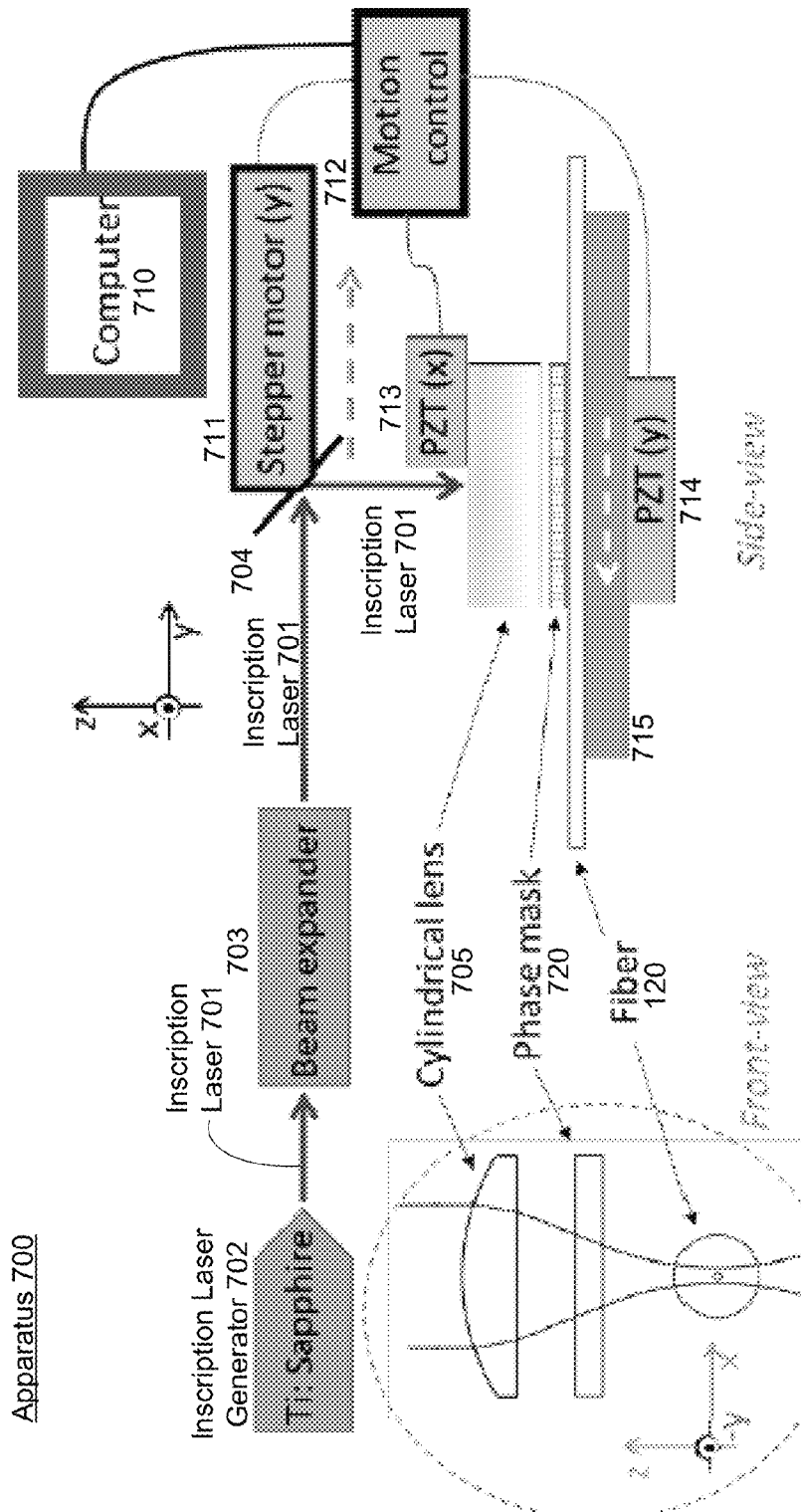
FIG. 7 illustrates an example apparatus to manufacture an improved RFL generator.

FIG. 7 illustrates an example apparatus to manufacture an improved RFL generator, in accordance with at least some embodiments of this disclosure. Apparatus 700 includes inscription laser generator 702, beam expander 703, mirror 704, and cylindrical lens 705. Apparatus 700 further includes computer 710, stepper motor 711, motion control 712, PZT(x) 713, PZT(y) 714, and stage 715. Apparatus 700 further includes phase mask 720 which may be placed over fiber 120.

To generate the periodic interference pattern FBG 121, apparatus 700 may use a phase mask 720 with a desired length and period, as elaborated for specific cases below. An inscription laser 701, e.g., an 800 nm Ti:Sapphire laser with a pulse duration of 20 fs and energy of 500 microJoules, may be produced by inscription laser generator 702. The phase mask 720 may be illuminated by the inscription laser 701, which may be expanded and shaped using a beam expander 703 and a cylindrical lens 705. Given limited extension of the inscription laser 701 with the desired peak intensities, the inscribing laser 701 may be scanned along the length of phase mask 720 using a precision motion control system comprising computer 710, stepper motor 711, motion control 712, PZT(x) 713, PZT(y) 714, and stage 715.

Figure 8:
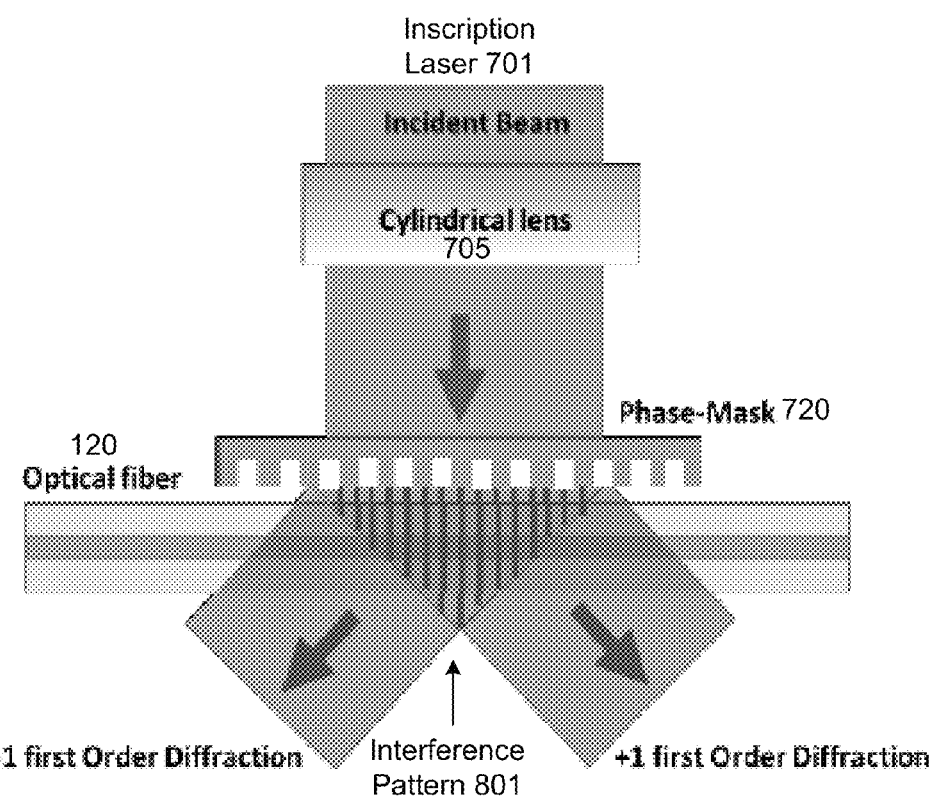
FIG. 8 illustrates an example interference pattern generated by a phase mask.

For a given fiber 120, the desired transmission spectrum will be achieved by careful selection of the inscription laser 701 pulse energy, phase-mask 720 design, inscription laser 701 illumination time, and the optical arrangement for exposing the fiber 120. FIG. 8 shows a close-up view of an interference pattern 801 generated by the first order diffraction (±1) orders from the phase mask 720.

In FIG. 7 and FIG. 8, the fiber 120 may be held at the intersection of the first order diffraction beams, and the interference pattern 801 may be written into the core of the fiber 120 using the photorefractive effect. The inscription laser 701, expanded by a beam expander 703, is elongated along the y-axis (in the direction of the fiber 120) using a cylindrical lens 705. The resulting inscription laser 701 illuminates the phase mask 720 that is placed on top of the fiber 120, optionally with a ~1 mm gap between phase mask 720 and fiber 120. The mirror 704 moves in the y direction to increase the length of the resulting FBG 121, and in the meantime is dithered along the x axis to illuminate the entire cross section. To generate a pi phase shift, when the inscription laser 701 reaches the middle of the phase mask 720, the fiber 120 moves in -y direction by one wavelength (of output laser 123), using the PZT stage 715, with the inscription laser 701 blocked.

Phase-shifted FBGs (PS-FBGs) can be fabricated by using uniform phase masks and a moving fiber-scanning beam technique. This approach can write pi-phase shifted uniform FBGs on fluoride or other fibers by femtosecond 800 nm laser pulses. Embodiments of this disclosure may use a similar approach to write a PS-FBG 121 on chalcogenide, fluoride, and tellurite fibers 120. To implement this method, the fiber 120 may be mounted on a PZT stage 715 to generate the pi (or an arbitrary) phase shift by moving the fiber 120 by one wavelength, or by one or more fractions of a wavelength, as the inscription laser 701 reaches the middle of the FBG 121, while blocking the inscription laser 701. The linewidth of the transmission peak created by the pi-phase shift depends on the photoinduced index contrast as well as the grating length. In some embodiments, FBGs 121 may be designed to yield bandwidths of <100 MHz.

Figure 9:
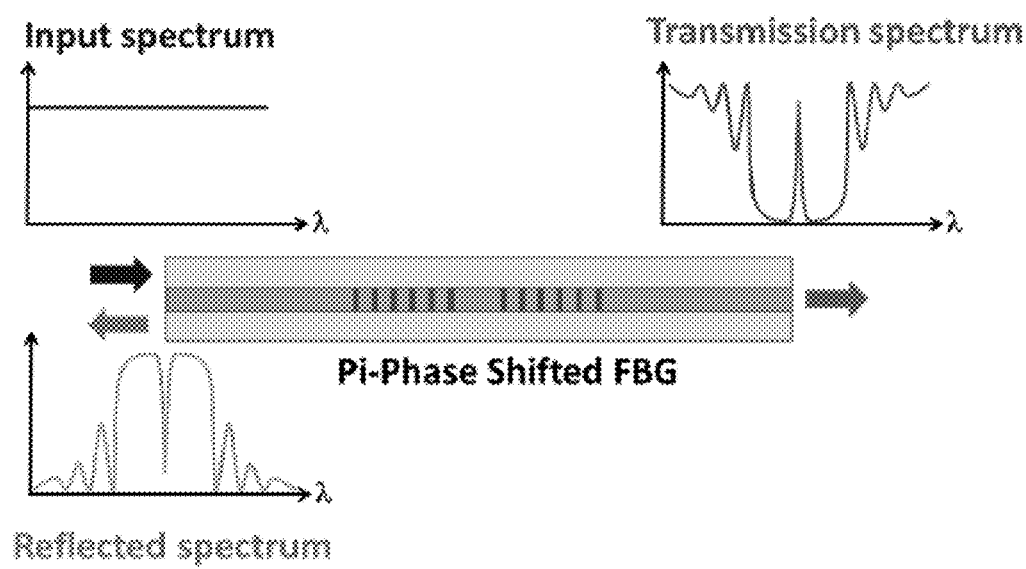
FIG. 9 shows typical transmission and reflection spectra for π-phase-shifted FBGs.

FIG. 9 shows typical transmission and reflection spectra for n-phase-shifted FBGs, in accordance with at least some embodiments of this disclosure. The distributed feedback through a pi-PS-FBG recirculates light at the design wavelength (middle of bandgap) resulting in narrow linewidth transmission peak (or laser emission in the presence of the pumped gain medium) in the middle of the reflective FBG bandwidth, as depicted by the transmission spectrum (upper right) and reflected spectrum (lower left). Tuning the value of the phase shift, say via an appropriately affixed PZT or by using thermos-optic changes in the local refractive index enables tuning of such pi-PS-FBGs, as described herein.

While various embodiments have been disclosed herein, other aspects and embodiments will be apparent to those skilled in art.

The invention claimed is:

1. An improved Raman fiber laser generator, comprising:
 a mid-infrared fiber comprising one or more of a tellurite glass or a chalcogenide glass;
 a phase-shifted fiber Bragg grating inscribed in the fiber; and
 a pump laser generator coupled with the fiber in order to supply a pump laser to the fiber;
 wherein the fiber comprising the phase-shifted fiber Bragg grating, when stimulated by the pump laser, emits an output laser having a wavelength of 2.0-16.0 microns; and
 a tuner adapted to modify the fiber comprising the phase-shifted fiber Bragg grating in order to tune the output laser, the tuner comprising a fiber bender adapted to bend the fiber comprising the phase-shifted fiber Bragg grating into a variable radius arc shape, the fiber bender comprising a sliding arm to control the variable radius arc shape, wherein the sliding arm is controlled by both a long-travel actuator and a short travel actuator.

2. The improved Raman fiber laser generator of claim 1, wherein the phase-shifted fiber Bragg grating is a π phase-shifted fiber Bragg grating.

3. The improved Raman fiber laser generator of claim 1, wherein the tuner comprises a heating element near the fiber comprising the phase-shifted fiber Bragg grating, wherein the heating element modifies phase shift and Bragg period produced by the fiber Bragg grating through a thermo-optic effect.

4. The improved Raman fiber laser generator of claim 3, wherein the heating element comprises a wire.

5. The improved Raman fiber laser generator of claim 1, further comprising a supporting substrate positioned along the fiber comprising the phase-shifted fiber Bragg grating, the supporting substrate supporting the fiber during bending thereof.

6. The improved Raman fiber laser generator of claim 1, wherein the fiber is 10-200 centimeters long.

7. The improved Raman fiber laser generator of claim 1, wherein the fiber is 20-40 centimeters long.

8. The improved Raman fiber laser generator of claim 1, wherein the fiber is 2-10 meters long.

9. The improved Raman fiber laser generator of claim 1, wherein the fiber Bragg grating is inscribed at each end of the fiber, and wherein the fiber Bragg grating includes high reflector (HR) and output coupler (OC) grating elements.

10. The improved Raman fiber laser generator of claim 1, wherein the pump laser supplied by the pump laser generator has a pump power between 50 mW and 500 Watts.

11. The improved Raman fiber laser generator of claim 1, wherein the pump laser supplied by the pump laser generator has a pump power between 500 mW and 2 Watts.

12. The improved Raman fiber laser generator of claim 1, wherein the phase-shifted fiber Bragg grating is inscribed in the fiber using a phase mask and inscription laser beam.

13. The improved Raman fiber laser generator of claim 1, wherein the output laser has a wavelength of 2.5-5 microns.

14. The improved Raman fiber laser generator of claim 1, wherein the output laser has a wavelength of 6-10 microns.

15. The improved Raman fiber laser generator of claim 1, wherein the mid-infrared fiber has a linewidth of 100 MHz or less.

16. A method to manufacture a Raman fiber laser generator, wherein the Raman fiber laser generator generates an output laser, the method comprising:
 inscribing a phase-shifted fiber Bragg grating in a mid-infrared fiber wherein the inscribing comprises:
 positioning a phase mask along the fiber;
 using a precision motion control system to scan an inscription laser beam along the phase mask; and
 blocking the inscription laser beam and moving the fiber one laser wavelength when the inscription laser beam reaches a point near a middle of the fiber Bragg grating, in order to generate a π phase-shifted fiber Bragg grating.

17. The method to fabricate a Raman fiber laser generator of claim 16, wherein the inscription laser beam is expanded and shaped using a beam expander and a cylindrical lens.

* * * * *